No. 879,593. PATENTED FEB. 18, 1908.
J. M. SIEGRIST.
TROLLEY WHEEL.
APPLICATION FILED SEPT. 4, 1907.
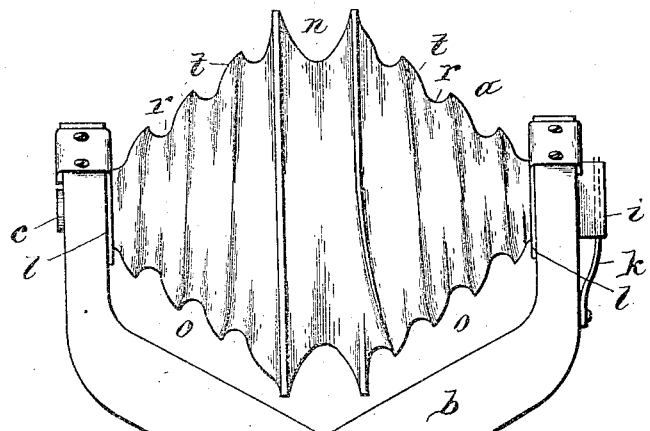
Fig.1
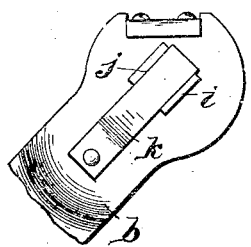
Fig.3
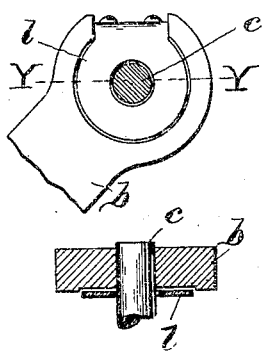
Fig.4
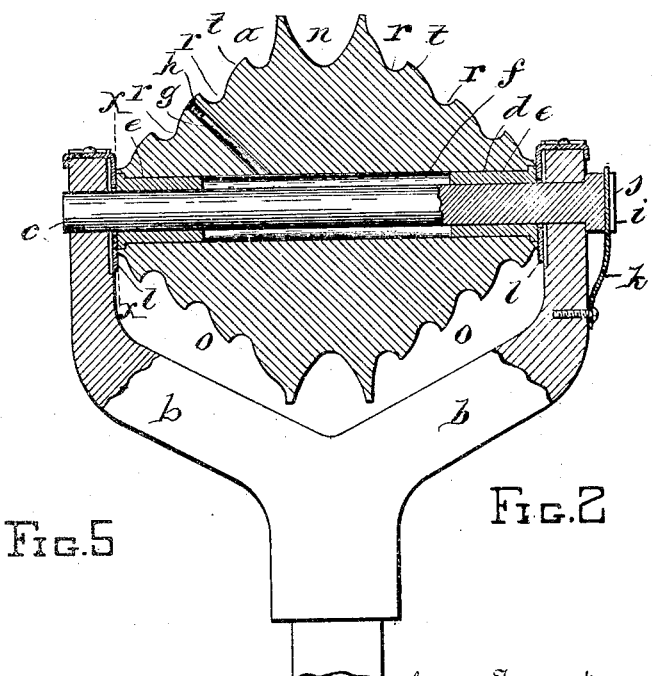
Fig.5
Fig.2
Witnesses:
J. J. Laas
W. H. Meier Jr.
Inventor:
Jacob M. Siegrist
By his Attorney
E. Laas

UNITED STATES PATENT OFFICE.

JACOB M. SIEGRIST, OF OSWEGO, NEW YORK.

TROLLEY-WHEEL.

No. 879,593.   Specification of Letters Patent.   Patented Feb. 18, 1908.

Application filed September 4, 1907. Serial No. 391,341.

*To all whom it may concern:*

Be it known that I, JACOB M. SIEGRIST, a citizen of the United States, and resident of Oswego, in the county of Oswego, in the State of New York, have invented new and useful Improvements in Trolley-Wheels, of which the following, taken in connection with the accompanying drawings, is a full, clear, and exact description.

This invention relates to the class of trolleys which are employed on electric cars for conducting the electric current from the trolley-wire to the motor of the car. And the invention consists in an improved construction of the trolley-wheel and its axial support as hereinafter described.

In the accompanying drawings Figure 1 is a face view of the trolley-wheel and the bifurcated end or so-called harp of the trolley pole; Fig. 2 is a central longitudinal section of the same; Fig. 3 is a side view of one of the arms of the harp; Fig. 4 is a transverse section on the line —X—X— in Fig. 2; and Fig. 5 is a transverse section on the line —Y—Y— in Fig. 4.

—a— represents the trolley-wheel, and —b— the fork or so-called harp on which the said wheel is carried. The axial support of the wheel —a— consists of the shaft —c— which is inserted endwise through perforations in the arms of the harp and passes through an axial cylindrical bore —d— extending through the wheel and considerably larger in diameter than the shaft as shown in Fig. 2 of the drawings. In each end of the bore —d— is a tubular bushing —e— composed of brass or other suitable metal and fitted tightly and fastened in said bore. Said bushings embrace the shaft —c— and constitute the journal bearings of the wheel. The said bearings are lubricated from the cylindrical chamber —f— formed directly around the central portion of the shaft by the enlarged cylindrical bore —d— and terminating at the inner ends of the bushings —e—e— which form dams across the ends of the chamber, as shown in Fig. 2. A channel —g— extends obliquely from the lubricant chamber —f— to the periphery of the wheel to allow the lubricant to be introduced into said chamber. The outer end of the channel —g— is provided with a suitable removable stopper —h—.

To retain the shaft —c— in its position in the harp and prevent it from turning, I form one of the ends of said shaft with a rigidly affixed head —i— which is formed with a shoulder on its inner side to bear on the outer side of the harp, and is provided in its outer face with a transverse groove —j—.

A spring tongue —k— is attached at one of its ends to the adjacent arm of the harp and has its free end passing through the groove —j— and pressing the head —i— inward so as to cause said head to bear on the outer side of the aforesaid arm of the harp.

The head —i— affords a convenient hold on the shaft for withdrawing it from the harp when required for repairing or renewing the trolley-wheel. Said withdrawal of the shaft is readily permitted by throwing the free end of the spring tongue —k— out of the groove —j— and swinging the said tongue aside from the head —i—.

—l—l— denote spring plates which are fastened at one end to the extremities of the arms of the harp and extend with their free ends between the inner sides of said arms and ends of the bushings —e— against which latter the spring plates press so as to restrain the bushings from striking the harp and thus obviate rattling thereof.

My described invention is especially desirable in trolley-wheels which are formed with the spirally grooved cheeks —o—o— owing to the increased length of the spindle or shaft —c— required for supporting the wheel. The spiral grooves are represented at —r— and serve to restore an accidentally displaced wheel to its proper position to travel with its central groove —n— on the trolley-wire.

To strengthen the walls of the grooves —r— I form said walls with a bulge —t— as shown.

What I claim as my invention is:

1. In combination with the harp and shaft, the trolley-wheel formed with a continuous axial bore of uniform diameter throughout the width of the wheel and larger than the diameter of the shaft, bushings secured in the ends of said bore and terminating in dams at the ends of the cylindrical lubricating chamber formed directly around the entire central portion of the shaft.

2. In combination with the harp and trolley-wheel, the shaft passing through said parts and formed at one of its ends with a rigid head provided with a shoulder to bear on the outer side of the harp and with a transverse groove in the outer face of said head, and a spring tongue attached at one end to the harp and having its free end passing through the aforesaid groove and pressing the head of the shaft onto the outer side of the harp.

JACOB M. SIEGRIST.

In presence of—
  J. J. LAASS,
  S. R. LAVINE.